US008584923B2

(12) United States Patent
Lee et al.

(10) Patent No.: US 8,584,923 B2
(45) Date of Patent: Nov. 19, 2013

(54) JOINING METHOD OF HIGH CARBON STEEL FOR ENDLESS HOT ROLLING AND THE APPARATUS THEREFOR

(75) Inventors: Jong-Sub Lee, Kyungsangbook-do (KR); Youn-Hee Kang, Kyungsangbook-do (KR); Chun-Soo Won, Kyungsangbook-do (KR); Jong-Bong Lee, Kyungsangbook-do (KR); Sang-Wook Ha, Kyungsangbook-do (KR); Kenji Horii, Hiroshima (JP); Toshihiro Usugi, Hiroshima (JP); Hideaki Furumoto, Hiroshima (JP); Shigenori Shirogane, Hiroshima (JP); Takao Funamoto, Hitachi (JP)

(73) Assignees: POSCO, Pohang (KR); Mitsubishi-Hitachi Metals, Tokyo (JP)

( * ) Notice: Subject to any disclaimer, the term of this patent is extended or adjusted under 35 U.S.C. 154(b) by 789 days.

(21) Appl. No.: 12/159,133

(22) PCT Filed: Nov. 20, 2006

(86) PCT No.: PCT/KR2006/004885
§ 371 (c)(1),
(2), (4) Date: Sep. 16, 2008

(87) PCT Pub. No.: WO2007/074972
PCT Pub. Date: Jul. 5, 2007

(65) Prior Publication Data
US 2011/0174869 A1 Jul. 21, 2011

(30) Foreign Application Priority Data

Dec. 26, 2005 (KR) .................. 10-2005-0130099

(51) Int. Cl.
*B23K 20/12* (2006.01)
(52) U.S. Cl.
USPC ........ 228/173.6; 228/115; 228/205; 228/44.3
(58) Field of Classification Search
USPC .................. 228/256, 173.6, 115, 205, 44.3
See application file for complete search history.

(56) References Cited

U.S. PATENT DOCUMENTS

| 5,878,966 A * | 3/1999 | Asakawa et al. ............. 239/590 |
| 6,955,287 B2 | 10/2005 | Horii et al. |
| 2001/0017312 A1* | 8/2001 | Horii et al. ................. 228/173.6 |

FOREIGN PATENT DOCUMENTS

| CN | 1304810 A | 7/2001 |
| JP | 61144285 A | 7/1986 |
| JP | 61286004 A | 12/1986 |
| JP | 9174117 A | 7/1997 |
| JP | 10034203 A | 2/1998 |
| JP | 2001232403 A | 8/2001 |

OTHER PUBLICATIONS

T.E. Moss, J.M. Hambright, T.E. Murphy and J.A. Schmidt, Hot-Rolled Steel Bars and Shapes, Properties and Selection: Irons, Steels, and High-Performance Alloys, vol. 1, ASM Handbook, ASM International, 1990, p. 240-247.*

* cited by examiner

*Primary Examiner* — Nicholas P D'Aniello
(74) *Attorney, Agent, or Firm* — The Webb Law Firm

(57) ABSTRACT

An endless hot rolling material shear-joining method capable of threading hot rolling materials in a finish rolling process without strip breakage by controlling joining conditions for the hot rolling materials in an endless hot rolling process for high carbon steel, and an endless hot rolling plant therefor are disclosed. The shear-joining method for endless hot rolling materials of high carbon steel includes shear-joining high carbon steel metal bars comprising, in terms of weight %, 0.30% to 1.20% C, inevitable impurities, and balance Fe, or comprising 0.15% to 1.5% C containing at least one of Cr, Ni, Mo, V, Ti, W, B, Nb, and Sb, inevitable impurities, and balance Fe, such that a joined surface of the joined metal bars is formed to be inclined in a thickness direction of the metal bars, in a hot rolling plant by a joiner adapted to join the metal bars after overlapping tail part of a leading one of the metal bar and top part of a trailing metal bar.

4 Claims, 15 Drawing Sheets stroke ratio : $(\Delta\ell_U + \Delta\ell_L)/t$

Lap $$\gamma_{interface} - 2\gamma_{free\ surface} = -1.7\gamma_{free\ surface}$$
$$(\gamma_{interface} \leq 0.3\gamma_{free\ surface})$$

stroke ratio : $(\Delta \ell_U + \Delta \ell_L)/t$

Lap

JOINING METHOD OF HIGH CARBON STEEL FOR ENDLESS HOT ROLLING AND THE APPARATUS THEREFOR

TECHNICAL FIELD

The present invention relates to a method for joining hot rolling materials in a hot rolling process in a manner to achieve endless hot rolling, and specifically, to a shear-joining method capable of threading high carbon steel in a finish rolling process without strip breakage by controlling joining conditions in an endless hot rolling process, and an endless hot rolling plant therefor.

BACKGROUND ART

In technical fields associated with production of hot-rolled metal bars, improvements in yield and quality with an enlargement in the available size of products in accordance with endless finish rolling are highly valued.

In such endless hot rolling fields, a metal bar joining technique is important. The metal bar joining technique is a technique for joining the tail part of a leading hot rolling material and top part of a trailing hot rolling material (hereinafter, either referred to as a "metal bar").

Joining of metal bars in a hot rolling process is achieved between a roughing mill and a finish rolling mill. When metal bars are joined subsequently after processing in the roughing mill, it is possible to endlessly roll the metal bars in a finish rolling process.

For endless finish rolling, accordingly, it is necessary to join metal bars traveling at high speed. For such joining, various techniques have been proposed.

Known techniques are classified into a melting joining method and a solid-phase joining method.

When metal bars are joined using the melting joining method, there is a drawback in that softening of the melted joint occurs because the temperature of the melted joint is higher than portions of the metal bars around the melted joint, so that the melted joint exhibits a degraded joining strength, as compared to the base metal of the metal bars.

For a technique known as the solid-state joining method, there is a metal bar joining method disclosed in Japanese Patent Unexamined Publication Heisei 9-17411 (hereinafter, referred to as "411 invention").

The 411 invention is a technique for joining metal bars by overlapping tail part of a leading metal bar and top part of a trailing metal bar, simultaneously shearing the overlapped two metal bars, and joining sheared surfaces of the metal bars formed in the shearing process in which the sheared surfaces are brought into contact with each other.

When the 411 invention is applied to an endless hot rolling plant, there are many advantages in that joining can be simply achieved within a short time because a shearing process is used to achieve the joining, and it is possible to decrease a reduction in temperature occurring during a finish rolling process because the required space is small.

However, the 411 invention has a drawback because the shape of the formed joint is non-uniform, and inclusion of surface scales between the joined surfaces may occur, so a considerable degradation in the joining strength of the joint may occur.

Furthermore, when metal bars are joined using the 411 invention, there may be a drawback in that the joined surfaces may have unjoined portions, or weak joined portions, at upper and lower cross-sectional portions thereof and opposite lateral end portions thereof. In addition, the inclusion of surface scales between the joined surfaces may occur, so that a degradation in joining strength may occur.

Meanwhile, high carbon steel is a kind of steel useful for tools because it exhibits high strength at normal temperature.

Endless hot rolling is carried out for such high carbon steel, using a joining technique, since many advantages such as an increase in yield and thinness can be obtained.

In this case, however, there are many problems in performing the endless hot rolling because high carbon steel is very brittle.

When endless hot rolling is carried out for such high carbon steel, using a welding technique, it is necessary to perform pre-heating and post-heating treatments because various welding cracks such as high-temperature cracks or low-temperature cracks may be easily formed. For this reason, in association with high carbon steel, there are drawbacks of a low welding workability and increased welding task difficulty.

Also, where a melting joining method, such as an induced heating method, is used for high carbon steel, there is a problem in that scales remain as defects in a joint because the melting point of the scales is higher than that of the base metal, so that it is difficult to force out the scales toward a bead in accordance with a pressing process carried out after a heating process.

Furthermore, in the case of high carbon steel, carbon contained in a large amount in the base metal reacts with the atmosphere during the welding process, thereby producing $CO$ or $CO_2$ gas which is, in turn, present in the welding site in the form of air pores. The presence of such air pores causes the joint to exhibit a degradation in mechanical performance not only at normal temperature, but also at high temperature after the completion of the welding process.

Due to the above-mentioned problems, applications for endless hot rolling to high carbon steel have been made in few cases.

Therefore, the present invention has been made in view of the above-mentioned problems incurred in conventional cases, and it is an object of the invention to provide a shear-joining method enabling application of endless hot rolling to high carbon steel.

Another object of the invention is to establish a shear-joining condition capable of allowing a joint of metal bars of high carbon steel, which is formed when the metal bars are joined, to sufficiently bear a finish rolling load in a finish rolling process, and to secure tensile characteristics capable of allowing the joint to withstand a tensile force generated between finish rolling stands.

SUMMARY OF THE INVENTION

In one aspect, the present invention provides a shear-joining method for endless hot rolling materials of high carbon steel comprising: shear-joining high carbon steel metal bars comprising, in terms of weight %, 0.30% to 1.20% C, inevitable impurities, and balance Fe, or comprising 0.15% to 1.5% C containing at least one of Cr, Ni, Mo, V, Ti, W, B, Nb, and Sb, inevitable impurities, and balance Fe, such that a joined surface of the joined metal bars is formed to be inclined in a thickness direction of the metal bars, in a hot rolling plant by a joiner adapted to join the metal bars after overlapping tail part of a leading metal bar and top part of a trailing metal bar.

Portions of the metal bars to be joined may be descaled at a pressure of 50 MPa or less.

The shear-joining of the metal bars may be executed under a condition in which a lap representing an overlap distance between upper and lower blades of the joiner ranges from 2 mm to 18 mm.

The shear-joining of the metal bars may be executed under a condition in which a stroke ratio representing a value obtained after dividing a sum of moved distances of upper and lower blades of the joiner by a thickness of the metal bars ranges from 1.3 to 1.7.

The shear-joining of the metal bars may be executed under the condition in which the upper and lower blades of the joiner move simultaneously in upward and downward directions, or only one of the upper and lower blades of the joiner moves.

In another aspect, the present invention provides a hot rolling plant comprising: a rough rolling mill for rough rolling high carbon steel slabs comprising, in terms of weight %, 0.30% to 1.20% C, inevitable impurities, and balance Fe, or comprising 0.15% to 1.5% C containing at least one of Cr, Ni, Mo, V, Ti, W, B, Nb, and Sb, inevitable impurities, and balance Fe, to produce rough-rolled metal bars; a coil box for winding the rough-rolled metal bars in the form of coils; a descaling apparatus for descaling portions, to be overlapped, of the metal bars unwound from a coiler of the coil box; a shear-joining apparatus including a pair of shearing blades for overlapping a tail part of a leading metal bars and top part of a trailing metal bars, pressing the overlapped portions toward each other while clamping the overlapped portions, to shear the overlapped portions, thereby shear-joining the metal bars; and a finish rolling mill for finish rolling the resultant shear-joined metal bar.

BEST MODE FOR CARRYING OUT THE INVENTION

Hereinafter, preferred embodiments of the present invention will be described in detail with reference to the annexed drawings.

In the present invention, "high carbon steel" means high carbon steel comprising, in terms of weight % (hereinafter, % represents weight % unless a particular representation is made), 0.30% to 1.20% C, inevitable impurities, and balance Fe, or high carbon steel comprising 0.15% to 1.5% C containing at least one of Cr, Ni, Mo, V, Ti, W, B, Nb, and Sb, inevitable impurities, and balance Fe.

Also, in the present invention, "shear-joining" means joining of metal bars in which the metal bars are joined in accordance with a plastic deformation occurring at sheared surfaces of the metal bars due to the shearing pressure generated when the metal bars are pressed against each other in an overlapped state by shearing blades positioned to face each other in a shearing process, to form the sheared surfaces such that the sheared surfaces are inclined in a thickness direction of the metal bars.

A description will be given of a hot rolling plant for performing endless hot rolling of high carbon steel while shear-joining the high carbon steel, and a method for shear-joining the high carbon steel using the plant, with reference to FIGS. 1 to 4.

Figure 1:
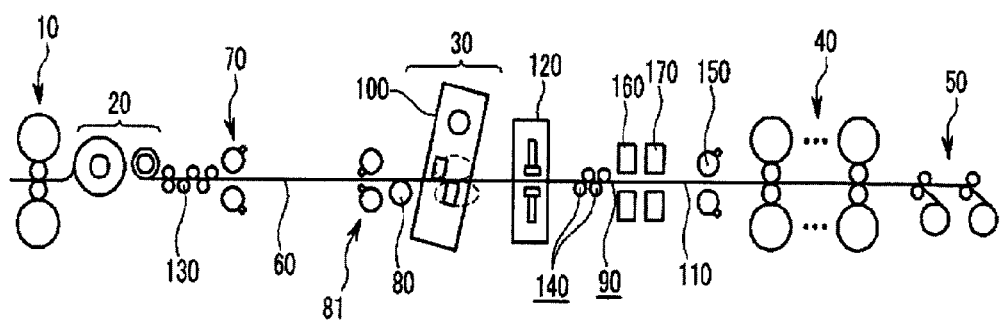
FIG. 1 is a view illustrating a basic configuration of an endless hot rolling plant for high carbon steel according to an embodiment of the present invention.

FIG. 1 illustrates an overall configuration of a hot rolling plant according to an embodiment of the present invention. Referring to FIG. 1, the hot rolling plant according to the present invention mainly includes a rough rolling mill 10, a coil box 20, a joining apparatus 30, an a finish rolling mill 40 including a plurality of rollers, which are arranged in this order, from the upstream of the hot rolling plant.

A metal bar of high carbon steel produced in according with a rough rolling operation of the rough rolling mill 10 for a high carbon steel bar is wound in the form of a coil by a coiler of the coil box 20. The coil box 20 adjusts a difference between the speed of a metal bar traveling in the rough rolling mill 10 and the speed of a metal bar traveling in the finish rolling mill 40.

A trailing metal bar 60, which is unwound from the coiler of the coil box 20, is sheared at a leading end thereof by a crop shear. The sheared trailing metal bar 60 is descaled by a descaling apparatus 81 at a surface thereof where joining of the metal bar 60 is carried out. The leading end of the trailing metal bar 60 is then overlapped with the tail part of a leading metal bar 90 in an overlapping unit 80 of the joining apparatus 30. In this case, the tail part of the leading metal bar 90 may be sheared by the crop shear, if necessary.

The leading end of the trailing metal bar 60 and the tail part of the leading metal bar 90 are joined by a joiner 100 of the joining apparatus 30. A crop formed at the joint is then cut by a crop treating unit 120. The resultant metal bar 110, which has an endless structure in accordance with the joining operation of the joining apparatus 30, is fed to the finish rolling mill 40.

The joining apparatus 30 is an apparatus for joining the trailing end of the leading metal bar 90 and the leading end of the trailing metal bar 60 under the condition in which the leading metal bar 90 and trailing metal bar 60 are traveling. In particular, the joining apparatus 30 is a short-period joining apparatus capable of achieving shear-joining within a short time.

In order to shear-join the metal bars, which are traveling, the joining apparatus 30 is movable in accordance with the travel of the metal bars. Accordingly, equipment for moving the joining apparatus 30 in accordance with the travel of the metal bars may be provided.

For example, the joiner 100 of the joining apparatus 30 includes a pair of shearing blades which shear overlapped portions of the leading metal bar 90 and trailing metal bar 60, namely, the trailing end of the leading metal bar 90 and the leading end of the trailing metal bar 60, by pressing the overlapped portions toward each other while clamping the overlapped portions.

The metal bar 110 fed to the finish rolling mill 40 is hot-rolled through a plurality of rollers in a sequential manner such that it has a desired thickness, and is then wound by the down coiler 50.

In FIG. 1, reference numerals 130 and 140 designate levelers arranged at respective outlets of the coil box 20 and joining apparatus 30. Reference numeral 150 represents a crop shear arranged at an inlet of the finish rolling mill. Reference numeral 160 represents an edge heater arranged between the leveler 140 and the crop shear 150. Reference numeral 170 represents a bar heater arranged in front of the edge heater 160.

The levelers 130 and 140, crop shear 150, edge heater 160, and bar heater 170 may be selectively arranged in accordance with the material to be hot rolled and hot rolling conditions. Although an example of the arrangements of these devices and the installation or non-installation of these devices is illustrated in FIG. 1, variations thereof may be possible.

The crop shear 70, which shears the trailing end of the leading metal bar 90 and the leading end of the trailing metal bar 60, is needed for abut-joining metal bars. However, when the metal bars are shear-joined in accordance with a process for shearing the metal bars in an overlapped state, the crop shear 70 is not needed. In this case, accordingly, the crop shear 70 may be dispensed with.

The joiner 100 according to the present invention and metal bars of high carbon steel in a shear-joining process will be described in detail with reference to FIGS. 2 and 3.

Figure 2:
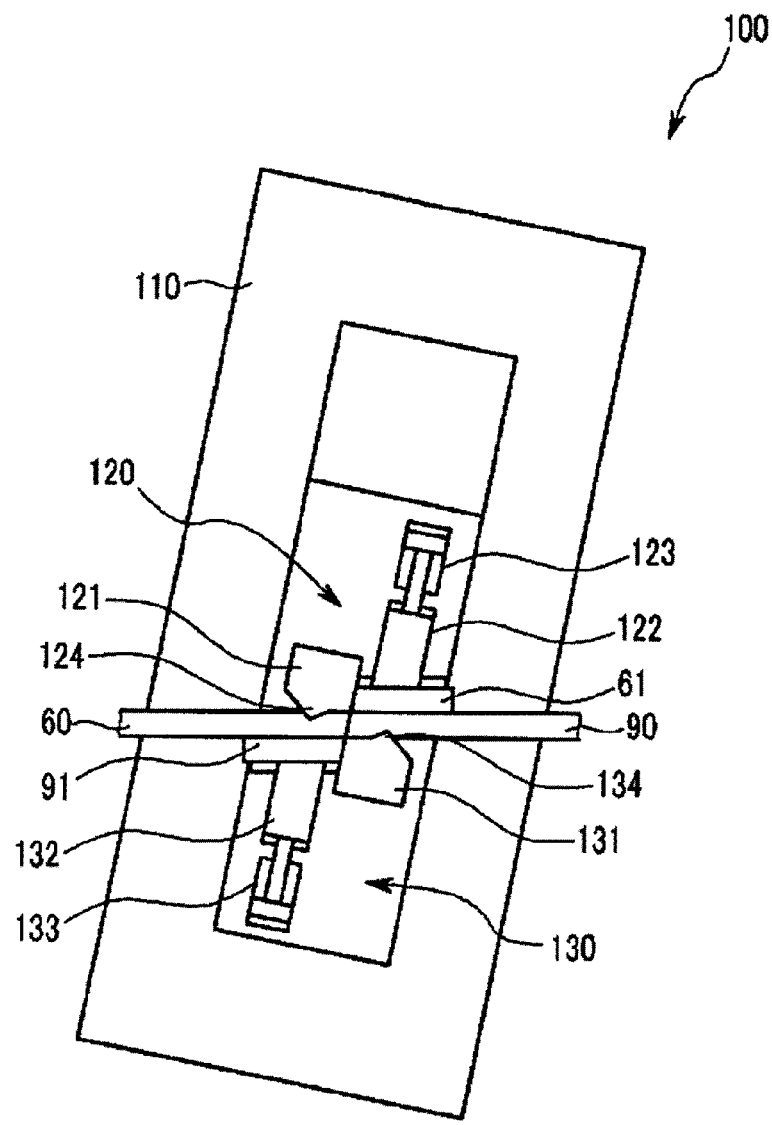
FIG. 2 is a view illustrating metal bars completely joined by a joiner according to an embodiment of the present invention.
Figure 3:
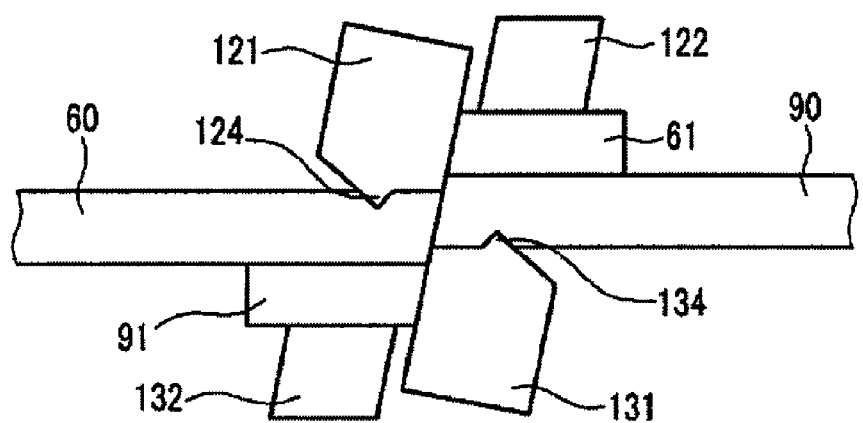
FIG. 3 is a concept diagram illustrating a state of the completely-joined metal bars according to the embodiment of the present invention.

Referring to FIG. 2, the joiner 100 according to the present invention mainly includes an upper blade assembly 120, a lower blade assembly 130, and a housing 110 for movably supporting the upper and lower blade assemblies 120 and 130.

The upper blade assembly 120 includes an upper blade 121, an upper clamp 122, and an upper support 123 which have an integral structure. The lower blade assembly 130 includes a lower blade 131, a lower clamp 132, and a lower support 133 which have an integral structure.

The upper blade assembly 120 and lower blade assembly 130 are guided by the posts (not shown) of the housing 110, and are supported such that they are movable in a thickness direction of the leading metal bar 90 and trailing metal bar 60. Also, the upper blade assembly 120 and lower blade assembly 130 are configured such that they move toward and away from each other by a link mechanism (not shown).

The leading metal bar 90 and trailing metal bar 60 are guided into the joiner 100 according to the present invention under the condition in which the leading end 220 of the trailing metal bar 60 is arranged over the trailing end 210 of the leading metal bar 90 in an overlapped state.

The overlapped portions of the trailing end 91 of the leading metal bar 90 and leading end 61 of the trailing metal bar 60, which are overlapped with each other in the above-described manner, are engaged between protrusions 124 and 134 of the upper and lower blades. That is, the protrusions 124 and 134 of the upper and lower blades come into contact with the surfaces of the leading end 61 and trailing end 91, respectively.

Also, the upper clamp 122 and lower clamp 132 come into contact with the overlapped portions of the leading end 61 of the trailing metal bar 60 and the trailing end 91 of the leading metal bar 90, respectively. Here, the upper clamp 122 is hy-draulically supported by the upper support 123, whereas the lower clamp 132 is hy-draulically supported by the lower support 133.

When the upper blade 121 and lower blade 131 shear the trailing metal bar 60 and leading metal bar 90, respectively in the above-described state, the sheared surfaces of the trailing metal bar 60 and leading metal bar 90 are shear-joined in accordance with a plastic deformation thereof. Thus, an endlessly-joined metal bar 110 having an integral structure is produced.

When the shear-joining of the ends of the metal bars is completed as described above, an upper crop cut from the leading end 61 of the trailing metal bar 60 and a lower crop cut from the trailing end 91 of the leading metal bar 90 are positioned at the joint of the endless metal bar. Also, after the joining of the metal bars, the upper blade 121 and lower blade 131 are retracted until they are spaced from each other by a certain distance.

The upper and lower crops produced in accordance with the shear-joining of the metal bars are removed by the crop treating unit 120 shown in FIG. 1. The endless metal bar 110 is fed to the finish rolling mill 40.

When the joint of the endless metal bar passes through the finish rolling mill 40, it is subjected to severe process conditions because a high compressive stress and external forces, such as a bending force and tension, are applied to the joint between the stands of the finish rolling mill during a finish rolling process.

In this case, the joint of the metal bar of high carbon steel should have a joining strength sufficient to allow the joint to pass through the finish rolling mill 40 without being broken.

Hereinafter, joining process parameters for controlling the joining strength of the joint when metal bars of high carbon steel are shear-joined in an endless hot rolling process will be described in detail.

Figure 4:
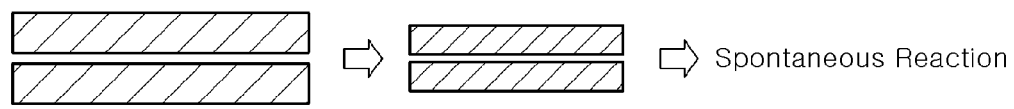
FIG. 4 is a concept diagram illustrating a variation in free energy in a solid-phase joining process according to an embodiment of the present invention.

First, a solid-phase joining process for two metal bars will be described in terms of metal thermodynamics, with reference to FIG. 4.

Solid-phase joining may be considered to be a process for deforming two free surfaces into one interface. In this case, the free energy variation in the solid-phase process can be thermodynamically calculated, as expressed by the following Expression 1:

$$\gamma_{interface} - 2\gamma_{free\ surface} = -1.7\gamma_{free\ surface} \qquad (1)$$

As in Expression 1, the free energy variation can be represented by $-1.7\gamma_{free\ surface}$ because the interface energy has a value corresponding to 30% or less of the free surface energy. Since $\gamma_{free\ surface}$ has a positive value, the overall energy variation has a negative value. This means that the two surfaces are spontaneously joined in accordance with a spontaneous reaction, namely, without any external force.

In practical cases, however, there is no occasion that two surfaces are spontaneously joined in the atmosphere without any external force. This is because irregularities and scales on the surfaces, which may be metal bar surfaces, interfere with the joining of the surfaces.

In order to join two metal bars, an attraction should be effected between atoms on the surfaces of the metal bars to be joined. In order to effect an attraction between atoms, the distance between the atoms should be in the unit of Å ($10^{-8}$ m).

However, irregularities are present on the surfaces of the metal bars even after the surfaces are machined. For this reason, the distance between the atoms on the surfaces of the two metal bars is longer than the unit of Å. Taking into consideration this fact, a high pressure (compressive force) is applied in a general solid-phase joining process. Since a very large force is required at normal temperature, the metal bars are heated to high temperature.

Although such a high pressure is applied, as described above, scales present on the surfaces of the metal bars or produced on the surfaces of the metal bars during the heating of the metal bars still cause a degradation in joining. Accordingly, it is necessary to reduce the amount of scales in the endless hot rolling process for high carbon steel, in order to secure a sufficient joining strength of a joint.

When two metal bars are joined in accordance with a conventional solid-phase joining method, it may be possible to achieve joining while suppressing inclusion of scales. Of course, this is a very exceptional case. However, even in this case scales are naturally produced on surfaces of two metal bars, which will be overlapped with each other, due to high-temperature oxidation since hot rolling of the metal bars is carried out at a high temperature of about 1,000° C. Even when descaling is performed to remove the produced scales, scales are again produced on the surfaces immediately after the descaling.

Furthermore, since the material of the metal bars exhibits a very high ductility at high temperature, the scales present on the surfaces to be overlapped may be included in the resultant joint. Such scale inclusion will cause a degradation of joining strength.

Hereinafter, the joining rate and joining strength ratio of a joint formed when two metal bars are joined in accordance with a hot rolling process as described above will be described with reference to FIG. 5.

Figure 5:
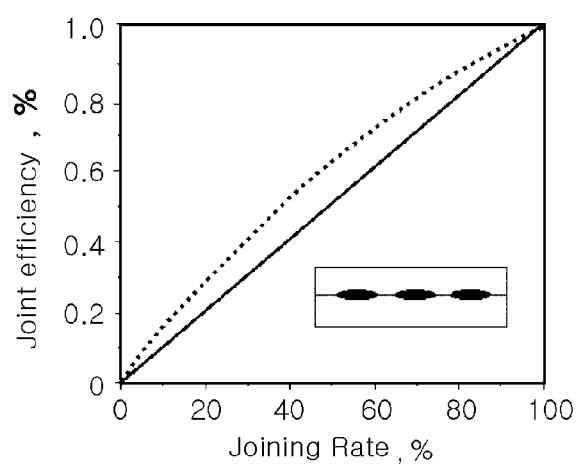
FIG. 5 is a graph depicting a relation between joining rate and joining strength ratio in the solid-phase joining process according to the embodiment of the present invention.

In FIG. 5, the straight line represents a relation between joining rate and joining strength ratio when it is theoretically assumed that there is no inter-scale joining force when no scale is included in a joint. Since the relation between joining rate and joining strength ratio is theoretically linear, the joining strength ratio must increase when an increase in joining rate occurs in the above-described theoretical case. Here, the joining rate represents a percentage corresponding to a value obtained after dividing the length of a portion of the joint completely joined without inclusion of scales by the overall length of the joint. This means the fact that, when inclusion of scales in the joint increases, the joining rate decreases, so that the joining strength ratio decreases.

In a practical hot rolling process, however, scales are inevitably produced due to the high-temperature condition of the hot rolling process. Also, there is a joining force between scales, even though the joint force is weak. For this reason, the joining strength ratio in this case is slightly higher than that of the theoretical case. That is, the relation as represented by the dotted line is established.

Now, joining conditions for controlling the joining strength of a joint formed when metal bars of high carbon steel are shear-joined in accordance with an endless hot rolling process will be described.

First, the shear-joining operation of the joiner 100 according to the present invention will be described with reference to FIG. 6.

Figure 6:
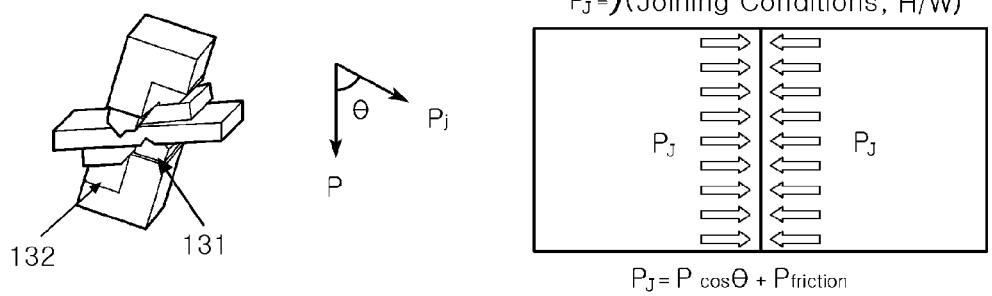
FIG. 6 is a concept diagram illustrating a joining force applied to joining surfaces in accordance with an embodiment of the present invention.

As shown in FIG. 6, the force for joining two metal bars in accordance with a shear-joining process corresponds to force components of a compressive load generated in accordance with pressing operations of the upper blade 121 and lower blade 131, that is, force components perpendicular to a joint to be formed. In addition, the joining force is increased by a frictional force generated between two surfaces produced in accordance with the shearing operation.

By virtue of such forces, facing pressures are exerted toward each other, as shown in a right portion of FIG. 6, so that a joint is formed.

The joining force is a function of the joiner 100 and process conditions. When this force is insufficient, the joint does not have sufficient joining strength. Meanwhile, the protrusions 124 and 134 provided at the upper and lower blades function to prevent the metal materials of the metal bars from flowing and to enable firm application of the joining force.

Figure 7:
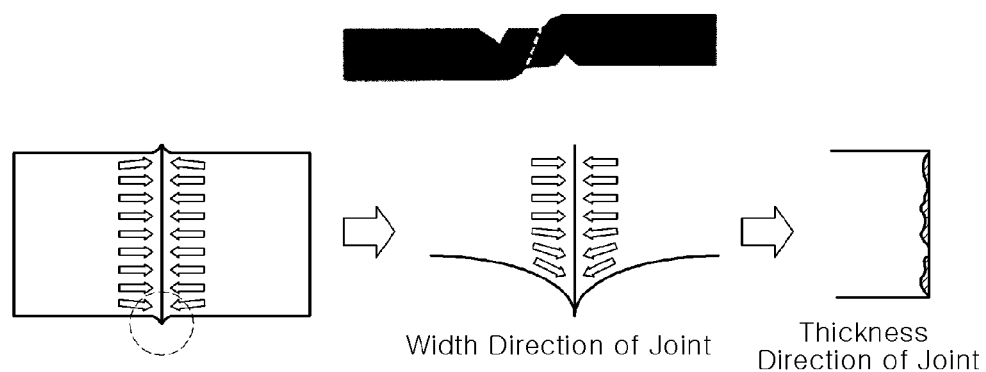
FIG. 7 is a concept diagram illustrating causes of a degradation in joining strength at edge portions and formation of cracks.

There is no problem associated with the central portions of the metal bars when viewing in the width direction of the metal bars, because the central portions are bound by the surroundings, as shown in FIG. 7. However, opposite ends of each metal bar when viewing in the width direction of the metal bar, namely opposite lateral ends, are in a free surface state without being bound.

Since the opposite lateral ends of the metal bars, which are in a free surface state, are outwardly diverged, as shown in FIG. 7, the facing forces are inclinedly exerted.

As a result, a degradation in joining strength occurs at the opposite lateral ends of the metal bars. Furthermore, partial oxidation may occur at the metal bar portions where joining strength degradation occurs, as shown in the right portion of FIG. 7. This causes formation of cracks in a subsequent finish rolling process. When the formation of cracks becomes severe, strip breakage may occur.

Also, the shape of the joint has influence on the joining strength. When a shear-joining process is used, there may be unjoined portions at upper and lower cross-sectional portions of the joint, due to the characteristics of the joining process. In this case, a variation in joining strength occurs depending on the positions and sizes of the unjoined portions.

Figure 8:
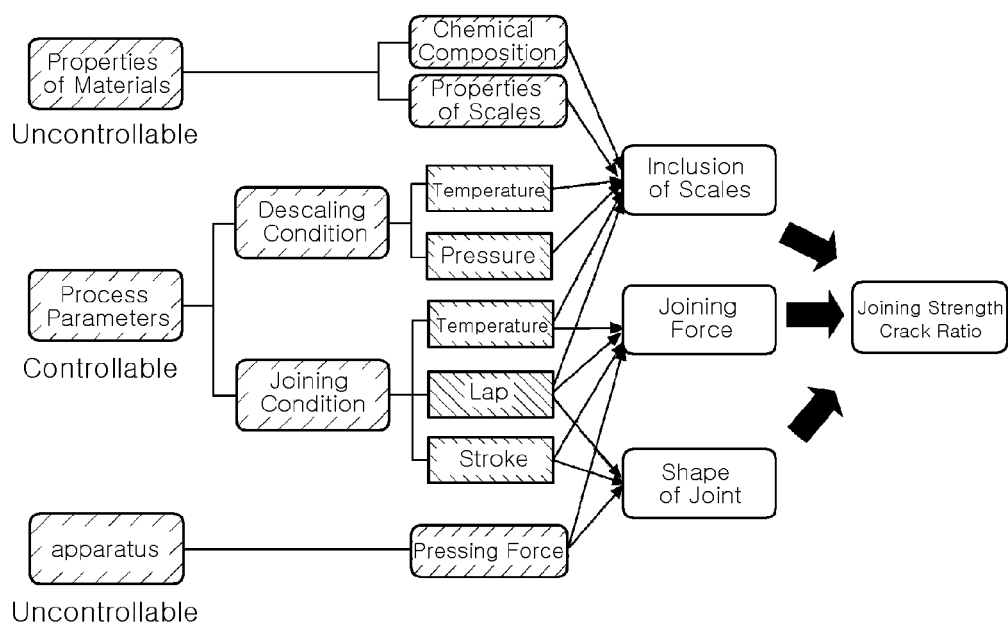
FIG. 8 is a block diagram for explaining joining parameters influencing the performance of a joint and relations among the joining parameters in accordance with the present invention.

The influences of various control factors on the performance of the joint can be arranged, taking into consideration the above description, as shown in FIG. 8.

Referring to FIG. 8, it can be seen that all the properties of the material of the metal bars, the process parameters, and the joiner have influence on the performance of the joint of the metal bars, namely the joining strength of the joint.

However, it is difficult to control the properties of the material and the joiner. In a practical case of joining the metal bars, accordingly, it is advantageous to control the process parameters, in terms of an easy control of joining conditions and security of control effects.

For such process parameters, there are a descaling condition and a joining condition.

The descaling condition is adapted to control the temperature and pressure in a descaling process such that inclusion of scales is suppressed. On the other hand, the joining condition is adapted to control the temperature, lap, and stroke ratio in the metal bar joining process, and thus to control the joining force at the joint and the shape of the joint.

In accordance with appropriate control of the five process parameters as described above, inclusion of scales and insufficient joining force, which cause a degradation in joining strength, can be solved. Also, it is possible to control the shape of the joint. It is also possible to suppress a degradation in the strength of the joint of the metal bars by controlling the above-described process parameters.

Figure 9:
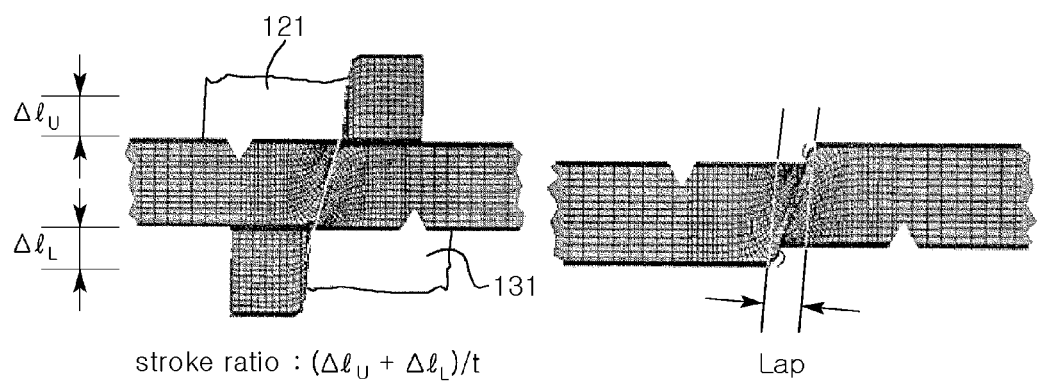
FIG. 9 is a concept diagram for explaining the definitions of stroke ratio and lap in accordance with the present invention.

The definition of the stroke ratio and lap, which are process parameters associated with the joining condition, will be described with reference to FIG. 9.

secure a desired threading stability of the joint in a finish rolling process, as long as the process parameters are appropriately controlled.

Of course, for high carbon steel, it is necessary to strictly control the process conditions, as compared to those for other kinds of steel, because scaling in high carbon steel exhibits high adherence to the base metal, as compared to those of low carbon steel.

Hereinafter, the process parameters and process conditions of the shear-joining process for high carbon steel controlled, taking into consideration the above facts, will be described through examples.

EXAMPLES

Experiments were conducted for the process parameters for shear-joining metal bars in the endless hot rolling plant shown in FIGS. 1 to 3, using metal bars of high carbon steel having compositions as described in the following Table 1.

TABLE 1

| Kind of Steel | Chemical Composition (wt %) | | | | | | | | | | |
|---|---|---|---|---|---|---|---|---|---|---|---|
| | C | Si | Mn | P | S | Cr | Ni | Cu | Mo | Al | V |
| S35C | 0.33 | 0.20 | 0.681 | 0.014 | 0.004 | 0.153 | 0.014 | 0.014 | 0 | 0.016 | 0 |
| S45C | 0.448 | 0.198 | 0.685 | 0.016 | 0.004 | 0.023 | 0.013 | 0.015 | 0.001 | 0.013 | 0 |
| SK85 | 0.851 | 0.197 | 0.413 | 0.014 | 0.003 | 0.16 | 0.012 | 0.015 | 0.001 | 0.008 | 0 |
| SCM435 | 0.350 | 0.97 | 0.684 | 0.017 | 0.003 | 0.987 | 0.019 | 0.015 | 0.195 | 0.016 | 0 |

The stroke ratio represents a value obtained by dividing a sum of distances, by which the upper blade 121 and lower blade 131 of the joiner 100 move downwardly and upwardly, respectively, by the thickness of the metal bars. Accordingly, when the stroke ratio increases, the thickness of the joint is decreased.

The lap represents the overlapping length of the upper blade 121 and lower blade 131. However, since the shearing blades (upper and lower blades) form a certain angle therebetween, the lap may become different slightly from a set value, in accordance with the stroke ratio, after the shearing operation of the shearing blades. Accordingly, where metal bars are shear-joined, measurement of the lap may be practically impossible. For this reason, it is preferred that the lap be controlled based on the set value for the joiner.

Since the above-described hot rolling plant according to the present invention and the joining method using the same involve a shear-joining process, they can be applicable to metal bars of high carbon steel exhibiting weak physical properties due to a high content of carbon.

Moreover, since the joining method according to the present invention involves a solid-phase joining process, it is possible to achieve shear-joining within a temperature range of the metal bars themselves heated for a hot rolling process, on the hot rolling plant line, without supplying a separate heat source. Accordingly, it is unnecessary to perform pre-heating and post-heating of the metal bars. It is also possible to prevent formation of cracks at the joint of the metal bars caused by use of a separate heat source.

In addition, since only a shearing force is used, different from conventional welding methods, there is a technical effect capable of fundamentally preventing problems occurring in a high carbon steel joining process, namely inclusion of scales and inclusion of air pores.

Thus, the shear-joining method according to the present invention is very useful in joining high carbon steel in an endless hot rolling process. In particular, it is possible to Experimental graphs shown in FIGS. 10 to 15 represent average experimental values of the steels shown in Table 1. The reason why such average experimental values were used is that it was experimentally that the high carbon steel compositions as described in Table 1 exhibit similar patterns of joint performance such as joint efficiency (to be described later).

Figure 10:
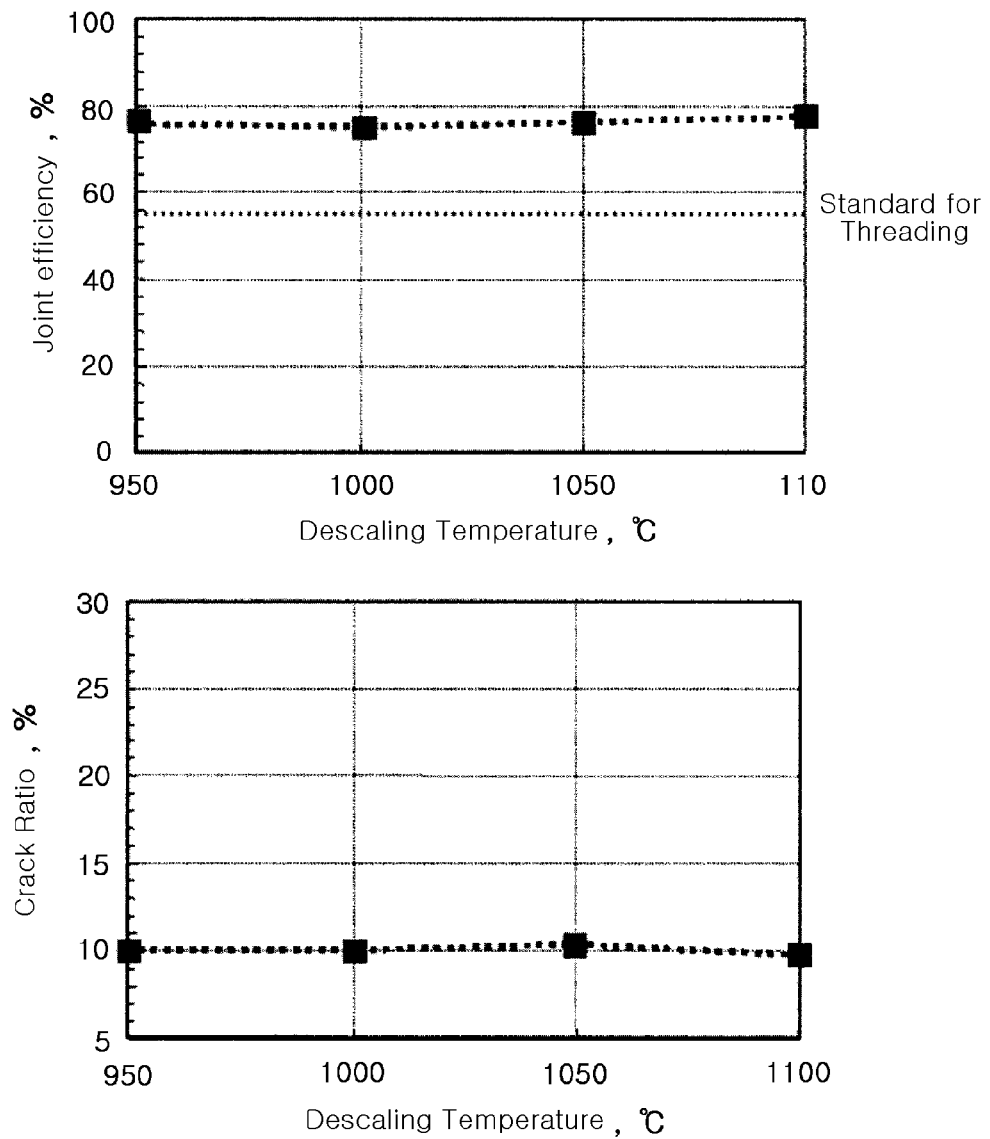
FIG. 10 shows graphs respectively depicting a relation between descaling temperature and joining strength ratio and a relation between descaling temperature and crack ratio in accordance with an embodiment of the present invention.

FIG. 10 depicts the influence of the descaling temperature on the joint efficiency and the edge crack ratio of the joints.

Here, the joint efficiency can be expressed by the following Expression 2:

joint efficiency=Strength of Joint Portions of Metal Bars/Strength of Base Metal Portions of Metal Bars (2)

Also, the edge crack ratio can be expressed by the following Expression 3:

Edge Crack Ratio=Sum of Left and Light Crack Lengths/Width of coil(Metal Bar) (3)

Referring to FIG. 10, it can be seen that, when metal bars of high carbon steel are shear-joined, the influence of the descaling temperature on the joint efficiency and edge crack ratio is low.

It was also found that, when the joint efficiency is low, strip breakage occurs at the first or second pass of a finish rolling process, whereas, when the edge crack ratio is high, strip breakage occurs at the latter pass of the finish rolling process.

Figure 11:
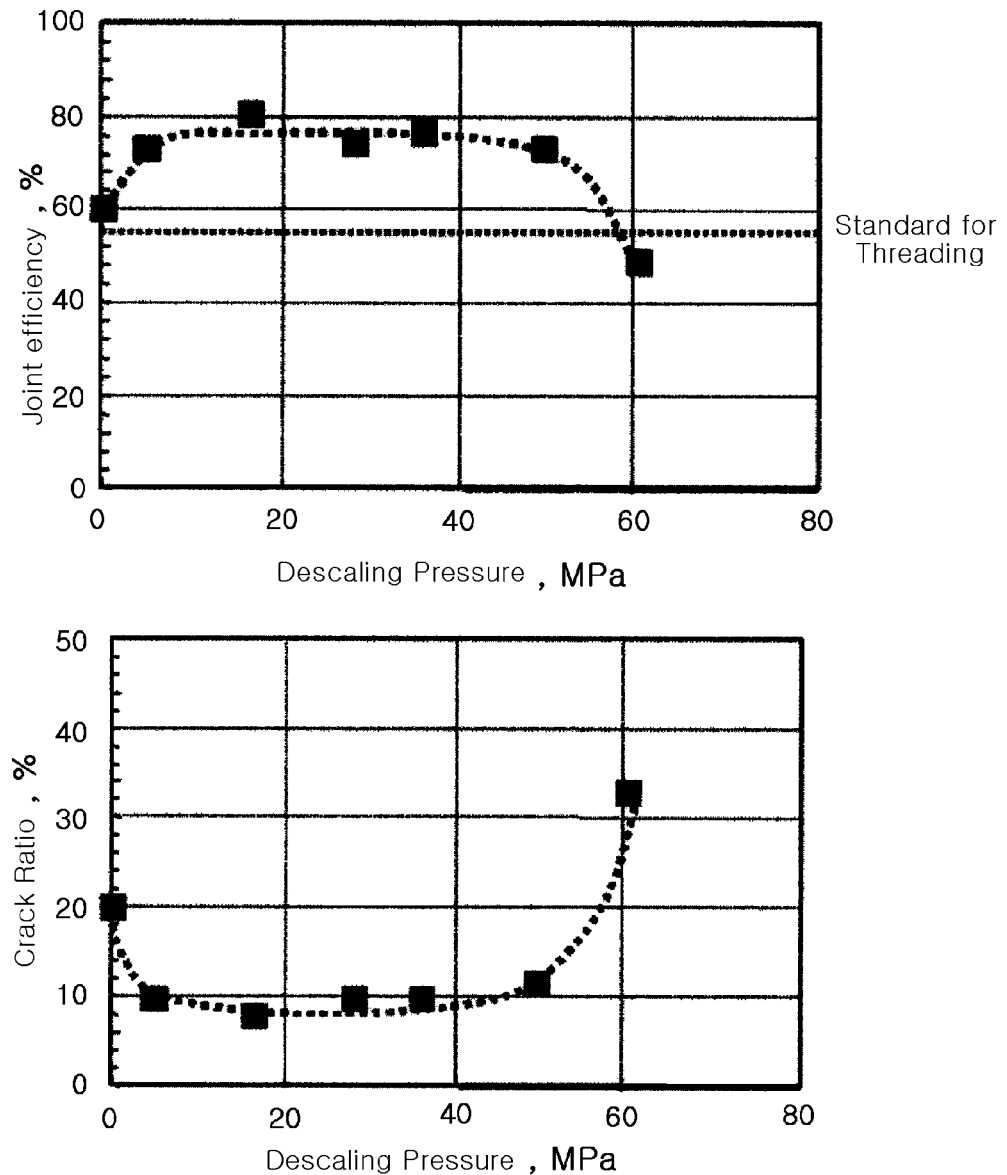
FIG. 11 shows graphs respectively depicting a relation between descaling pressure and joining strength ratio and a relation between descaling pressure and crack ratio in accordance with an embodiment of the present invention.

FIG. 11 depicts the influence of the descaling pressure on the joint efficiency and the edge crack ratio.

Referring to FIG. 11, it can be seen, from the results of experiments for threading stability of a joined metal bar subjected to a finish rolling process, that the finish rolling of the joined metal bar is achieved without causing joint breakage of the metal bar when the joint efficiency is 52% or more. Threading was possible at an edge crack ratio below 30%.

As shown in FIG. 11, when the descaling pressure increases, surface scale dragged into the joint is decreased, so that joint strength is increased. Also, the unjoined area at the opposite lateral ends of the metal bars is reduced, so that the edge crack ratio is reduced.

However, when the descaling pressure is excessively high, the amount of spray is increased. In this case, the temperature of the joint is excessively lowered, so that it is difficult to secure a temperature required for a subsequent process, namely the finish rolling process.

Furthermore, the excessive descaling pressure causes damage of the base metal of the metal bars exhibiting weakness in terms of high-temperature strength. In this case, severe irregularities are formed on the surfaces of the metal bar portions to be joined, so that a degradation in joinability occurs.

As can be seen from the above-described experimental results, it is preferred that, when high carbon steel is shear-joined using the joiner, the descaling pressure in the descaling apparatus 81 arranged upstream from the joiner 100 be controlled to be 50 MPa or less.

The reason why the preferred descaling pressure is 50 MPa or less is that, although a degradation in joinability caused by damage of the base metal of the metal bars is begun at 35 MPa or more, the standard for threading is satisfied at a descaling pressure of up to 50 MPa.

Also, for high carbon steel, the descaling process may be dispensed with. This is because it is possible to obtain a joining strength enabling threading and a low edge crack ratio in the finish rolling process, even when the descaling pressure is 0 MPa.

Figure 12:
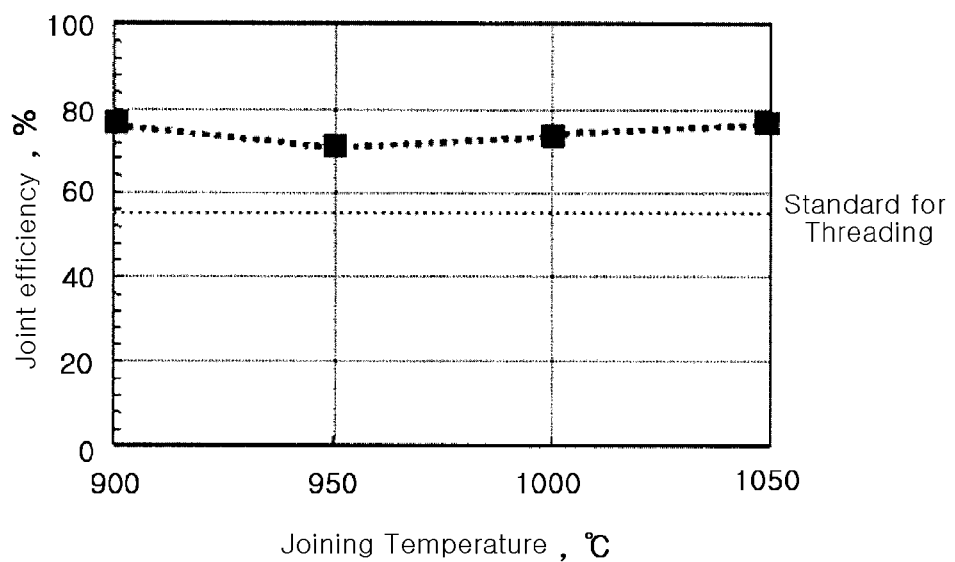
FIG. 12 is a graph depicting a relation between joining temperature and joining strength ratio in accordance with an embodiment of the present invention.

FIG. 12 depicts the joint strength ratio depending on the joining temperature in a shear-joining process for high carbon steel.

As shown in FIG. 12, the joining temperature in the shear-joining process for high carbon steel had little influence on the joining strength ratio, and also had little influence on the edge crack ratio.

Figure 13:
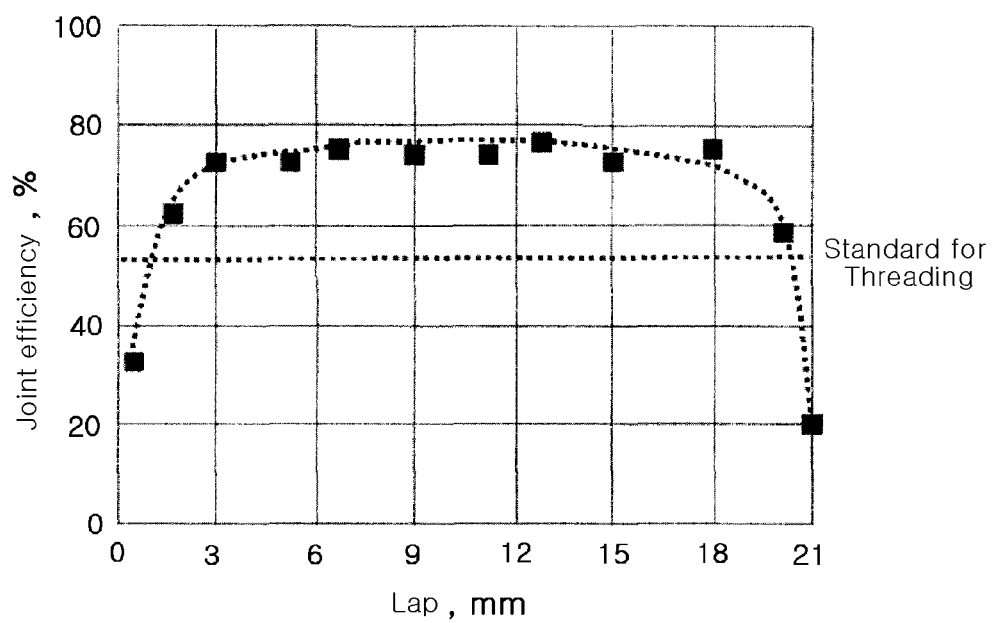
FIG. 13 is a graph depicting a relation between lap and joining strength ratio in accordance with an embodiment of the present invention.

FIG. 13 depicts the joint strength ratio depending on a variation in lap in a shear-joining process for high carbon steel.

Referring to FIG. 13, it can be seen that the lap and joint efficiency have a relation in the form of a Gaussian distribution, namely a parabolic relation.

That is, when the lap increases, the joint efficiency increases. As a result, the standard for threading (to be described later) begins to be satisfied at a lap of 2 mm or more, is reduced at a lap of 18 mm or more, and is unsatisfied at a lap of more than 21 mm.

The reason why the standard for threading is satisfied in a lap range of 2 mm to 18 mm is as follows.

The reason why the joining strength increases in accordance with an increase in lap is that an increase in lap causes a reduction in the angle of the joining line resulting in an increase in the force component of the vertical stress of the shearing blades, namely the force component perpendicular to the joining line. When the lap is higher than a certain value, a reduction in joining strength occurs because the required load must increase.

Therefore, it is preferred that the lap range be from 2 mm to 18 mm.

On the other hand, although the edge crack ratio was greatly influenced by the descaling pressure, there was little influence of the lap on the edge crack ratio. This is because, although an increase in joining force occurs in accordance with an increase in lap, the joining force at the edge portions is reduced due to a divergence of the edge portions in a width direction, so that oxidation of the edge portions occurs, and thus the effect of the controlled lap becomes very small.

As the shearing blades are used, the abrasion thereof increases, thereby causing the lap to vary. As a result, the measurement of the lap in a practical hot rolling line is difficult. In this regard, the lap in the present invention means a value set in the joiner 100.

Figure 14:
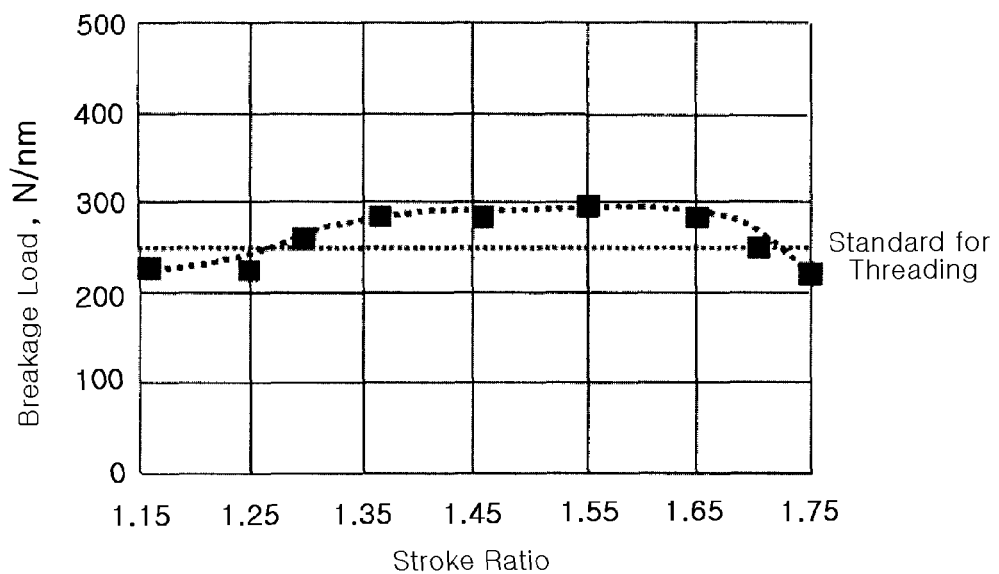
FIG. 14 is a graph depicting a relation between stroke ratio and joining strength ratio in accordance with an embodiment of the present invention.

FIG. 14 is a graph depicting the breakage load of the metal bars depending on the stroke ratio in a shear-joining process for high carbon steel.

Referring to FIG. 14, it can be seen that the breakage load of the joint increases gradually in accordance with an increase in stroke ratio, satisfies the standard for threading at 1.30, substantially exhibits a saturation at 1.45 or more, and decreases again at 1.65 or more. However, the breakage load of the joint still satisfies the standard for threading at the stroke ratio of up to 1.70.

Therefore, it is preferred that the stroke ratio of the joiner 100 in a shear-joining process for high carbon steel be 1.30 to 1.70.

In this case, the stroke may be controlled such that the upper and lower blades of the joiner 100 are simultaneously moved in downward and upward directions, to achieve shear-joining. Alternatively, the shear-joining may be achieved by moving only one of the upper and lower blades.

The stroke ratio has influence on the thickness of the joint, different from other joining conditions. That is, when the stroke ratio increases, the thickness of the joint decreases. Accordingly, it is possible to reduce the load while increasing the joining strength. To this end, the relation between the stroke ratio and the breakage load of the joint was investigated. Referring to FIG. 14, it can be seen that, when the stroke ratio increases, the breakage load of the joint increases, in spite of a decrease in the thickness of the joint. This means that the joint efficiency is remarkably increased in accordance with an increase in stroke ratio.

Although an increase in elongation also occurs in accordance with an increase in stroke ratio, its influence on the edge crack ratio is not great. The reason why the phenomenon of the breakage stress and breakage load increasing in accordance with an increase in stroke ratio occurs is that the joining force is increased, and the positions and shapes of the unjoined portions at the upper and lower cross-sectional portions of the joint are varied in accordance with an increase in stroke ratio.

Figure 15A:
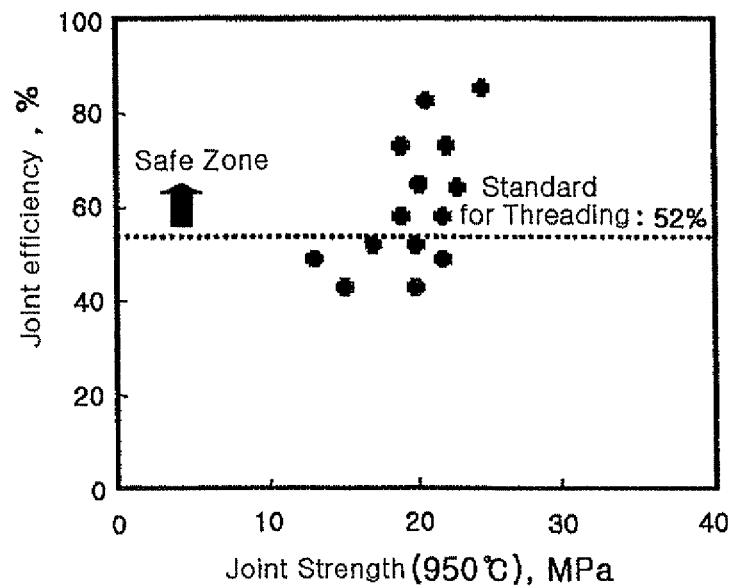
FIGS. 15 (a) and (b) shows graphs depicting results of a test for threading of a joint in a finish rolling process in accordance with an embodiment of the present invention.
Figure 15B:
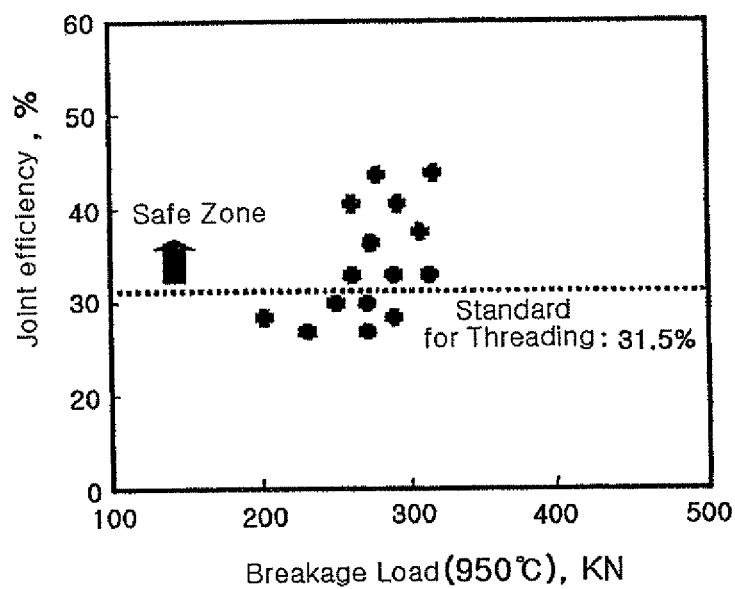

FIGS. 15 (a) and (b) depict results of a threading test in a finish rolling mill for the high carbon steel according to each example shear-joined in a hot rolling plant. Referring to FIGS. 15 (a) and (b), the standard for threading according to the present invention can be identified.

FIGS. 15 (a) and (b) depict results of metal bars of high carbon steel materials respectively having compositions described in Table 1, obtained after shear-joining the metal bars of each composition and rolling the resultant joined metal bar in a finish rolling mill installed in a hot rolling plant.

The test samples tested to obtain test results depicted by the graphs of FIGS. 15 (a) and (b) were prepared by shear-joining metal bars of high carbon steel having a width of 450 mm to prepare two sets of test samples, side-welding each test sample set to have a width of 840 mm to 900 mm, and then welding bars having the same thickness as the side-welded metal bar to upstream and downstream ends of the side-welded metal bar to obtain a metal bar having a length of 900 mm. The test results were obtained after heating each metal bar in a heating furnace, and performing a finish rolling process for the heated metal bar.

As can be seen from the test results, in FIG. 15 (a), all the metal bars having a joint efficiency of less than 52% exhibited strip breakage in the finish rolling process, whereas the metal bars having a joint efficiency of 52% or more were successfully threaded in the finish rolling process.

The metal bars successfully threaded in the finish rolling process as described above exhibited a joint edge crack ratio of 25% or less.

Under the condition in which the stroke ratio is fixed, there is no problem even when the standard for threading is set based on the joining strength ratio. However, when the stroke ratio varies, the thickness of the joint varies. The lower graph of FIG. 15 (b) depicts results obtained taking into consideration the above-described phenomenon. "Joining load ratio" in the graph can be expressed by the following Expression 4. The standard for threading corresponds to a joining load ratio of 31.5%.

$$\text{Joining Load Ratio} = \text{Joint Breakage Load}/\text{Base Metal Breakage Load} \quad (4)$$

As can be seen from FIG. 15 (b), the standard for threading in the finish rolling step means that the joint efficiency and breakage load in the finish rolling process are satisfied without breakage of the metal bars.

Although the preferred embodiments of the present invention have been described, the present invention is not limited to the joining conditions at the joint in the above-described endless hot rolling process for high carbon steel, but is applicable to various joining methods needed to implement shear-joining in the above-described endless hot rolling process for high carbon steel.

Accordingly, those skilled in the art will appreciate that various modifications, additions and substitutions are possible, without departing from the scope and spirit of the invention as disclosed in the accompanying claims.

As apparent from the above description, the method for shear-joining endless hot rolling materials of high carbon steel in accordance with the present invention provides a technical effect capable of enabling joining of hot rolling materials of high carbon steel in accordance with a shear-joining process, which has not been applied before, and thus enabling endless hot rolling the hot rolling materials of high carbon steel.

In accordance with the present invention, there are technical effects when metal bars of high carbon steel are joined, in that the joint of the metal bars can sufficiently bear the finish rolling load in the finish rolling process, and shear-joining conditions securing tensile characteristics capable of allowing the joint to withstand a tensile force generated between finish rolling stands.

In addition, when metal bars of high carbon steel are endlessly hot-rolled, the present invention provides a technical effect capable of providing process parameters enabling implementation of endless hot rolling without strip breakage in a subsequent finish rolling process, even in cases in which the metal bars have been joined.

When the process condition ranges according to the present invention are applied, the joint of the metal bars can exhibit a superior performance, for example, sufficient durability against a high compressive load generated during a finish rolling process and a tension load applied between finish rolling stands, even though the material of the metal bars is high carbon steel.

Accordingly, endless hot rolling can be achieved in the finish rolling process without strip breakage, namely joint breakage.

The invention claimed is:

1. A shear-joining method for endless hot rolling materials of high carbon steel comprising:
    shear-joining a pair of metal bars having a thickness, the metal bars comprising high carbon steel having, in terms of weight %, 0.30% to 1.20% C, inevitable impurities, and balance Fe, or comprising 0.15% to 1.5% C, containing at least one of Cr, Ni, Mo, V, Ti, W, B, Nb, and Sb, inevitable impurities, and balance Fe, such that a joined surface of the joined metal bars is formed to be inclined in a thickness direction of the metal bars, in a hot rolling plant by a joiner having upper and lower blades adapted to join the metal bars after overlapping a trailing end of a leading one of the metal bars and a leading end of a trailing one of the metal bars, wherein the shear-joining of the metal bars is executed under a condition in which a stroke ratio ranges from 1.55 to 1.7, wherein the stroke ratio represents a value obtained by calculating a sum of a distance moved by the upper blade of the joiner and a distance moved by the lower blade of the joiner and dividing by the thickness of the metal bars, and wherein portions of the metal bars to be joined are descaled at a pressure of 50 MPa or less.

2. The shear-joining method according to claim 1, wherein the shear-joining of the metal bars is executed under a condition in which a lap representing an overlap distance between upper and lower blades of the joiner ranges from 2mm to 18mm.

3. The shear-joining method according to claim 1, wherein the shear-joining of the metal bars is executed under the condition in which the upper and lower blades of the joiner move simultaneously in upward and downward directions.

4. The shear-joining method according to claim 1, wherein the shear-joining of the metal bars is executed under the condition in which only one of the upper and lower blades of the joiner moves.

* * * * *

UNITED STATES PATENT AND TRADEMARK OFFICE
CERTIFICATE OF CORRECTION

PATENT NO.        : 8,584,923 B2                                    Page 1 of 1
APPLICATION NO. : 12/159133
DATED             : November 19, 2013
INVENTOR(S)       : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this
Twenty-second Day of September, 2015

Michelle K. Lee
*Director of the United States Patent and Trademark Office*